(12) United States Patent
Agrawal et al.

(10) Patent No.: US 12,462,081 B2
(45) Date of Patent: Nov. 4, 2025

(54) SYSTEMS AND METHODS FOR GENERATING INTERIOR DESIGNS USING ARTIFICIAL INTELLIGENCE

(71) Applicant: Inhabitr, Inc., Chicago, IL (US)

(72) Inventors: Ankur Agrawal, Chicago, IL (US); Vinod Koppurapu, Fremont, CA (US); Vinay Bhardwaj, Orinda, CA (US)

(73) Assignee: Inhabitr, Inc.

( * ) Notice: Subject to any disclaimer, the term of this patent is extended or adjusted under 35 U.S.C. 154(b) by 0 days.

(21) Appl. No.: 18/604,423

(22) Filed: Mar. 13, 2024

(65) Prior Publication Data

US 2024/0311533 A1    Sep. 19, 2024

Related U.S. Application Data

(60) Provisional application No. 63/451,777, filed on Mar. 13, 2023.

(51) Int. Cl.
*G06F 7/48* (2006.01)
*G06F 30/12* (2020.01)
(Continued)

(52) U.S. Cl.
CPC .............. *G06F 30/27* (2020.01); *G06F 30/12* (2020.01); *G06F 30/13* (2020.01); *G06F 2111/16* (2020.01); *G06F 2111/18* (2020.01)

(58) Field of Classification Search
CPC .......... G06F 30/27; G06F 30/12; G06F 30/13; G06F 2111/16; G06F 2111/18
See application file for complete search history.

(56) References Cited

U.S. PATENT DOCUMENTS

| | | | |
|---|---|---|---|
| 11,520,949 B2 * | 12/2022 | Reynolds | G06F 30/27 |
| 2008/0281561 A1 * | 11/2008 | Shulman | G06F 30/13 |
| | | | 703/1 |

(Continued)

OTHER PUBLICATIONS

Bell, Sean, and Kavita Bala. "Learning visual similarity for product design with convolutional neural networks." ACM transactions on graphics (TOG) 34.4 (2015): 1-10. (Year: 2015).*

(Continued)

*Primary Examiner* — Nithya J. Moll
(74) *Attorney, Agent, or Firm* — AEON Law, PLLC; Adam L. K. Philipp; Jonathan E. Olson

(57) ABSTRACT

Systems, methods and/or interfaces are provided for generating interior design options. In some implementations, the method includes obtaining an inspiration image of a portion of a room, a furniture, fixture and equipment, or a combination. The method also includes parsing the image, including segmenting the inspiration image into sub-images corresponding to each furniture, fixture or equipment. The method also include identifying alternatives based on the sub-images and a layout of the room, including coordinating the alternatives with respect to each other and coordinating the alternatives with respect to the room. The method also includes generating and/or displaying variations of the room with images corresponding to the alternatives. In some implementations, the method includes parsing an image to generate an empty room sketch or schematic, generating alternatives to be placed in the empty room according to the room, and generating and/or displaying a visualization by placing the alternatives in the room.

15 Claims, 14 Drawing Sheets

(51) Int. Cl.
  *G06F 30/13* (2020.01)
  *G06F 30/27* (2020.01)
  *G06F 111/16* (2020.01)
  *G06F 111/18* (2020.01)

(56) References Cited

U.S. PATENT DOCUMENTS

| | | | |
|---|---|---|---|
| 2011/0216979 A1* | 9/2011 | Barkol | G06T 7/32 |
| | | | 382/218 |
| 2017/0132841 A1* | 5/2017 | Morrison | G06V 20/20 |
| 2018/0144394 A1 | 5/2018 | Velusamy | |
| 2019/0164340 A1 | 5/2019 | Pejic et al. | |
| 2019/0180338 A1* | 6/2019 | Swanson | G06Q 30/0613 |
| 2020/0242849 A1* | 7/2020 | Cini | G06T 19/20 |
| 2021/0019453 A1* | 1/2021 | Yang | G06N 5/01 |
| 2021/0117071 A1 | 4/2021 | Gharpuray | |
| 2021/0173968 A1 | 6/2021 | Yang et al. | |
| 2021/0174275 A1* | 6/2021 | Valencich | G06Q 10/0631 |
| 2021/0232719 A1* | 7/2021 | Ganihar | G06T 17/10 |
| 2022/0292574 A1 | 9/2022 | Rose et al. | |
| 2022/0327608 A1 | 10/2022 | Assouline et al. | |

OTHER PUBLICATIONS

Gao, Ying, et al. "Wallpaper texture generation and style transfer based on multi-label semantics." IEEE Transactions on Circuits and Systems for Video Technology 32.3 (2021): 1552-1563. (Year: 2021).*

Inhabitr, Inc., International Search Report and Written Opinion, PCT/US2024/019812, Sep. 19, 2024, 19 pgs.

Weiss et al., "Image-Driven Furniture Style for Interactive 3D Scene Modeling", Pacific Graphics 2020, The Eurographics Association and John Wiley & Sons Ltd., Oct. 20, 2020, 12 pgs.

"Interior AI" (Kind Spirit Technology) Jan. 1, 2023, [online], [retrieved on May 28, 2024]. Retrieved from the internet URL:https://www.youtube.com/watch?v=144fzXgKceQ, especially 1:44-2:23.

Zhang et al., "Decorating Your Own Bedroom: Locally Controlling Image Generation with Generative Adversarial Networks", May 18, 2021, [online], [retrieved on May 28, 2024], Retrieved from the internet URL:https://arxiv.org/pdf/2105.08222, pp. 1 to 5, esp. pp. 1 to 4, fig 1.

Akinfaderin, "End-to-End Object Detection for Furniture Using Deep Learning", May 16, 2019 [online], [retrieved on May 28, 2024]. Retrieved from the internet https://blog.insightdatascience.com/end-to-end-object-detection-for-furniture-using-deep-learning-45a235f47a9a ; pp. 1 to 10, especially pp. 1 to 3.

"AI Design Your Interior | Get Inspirational Ideas" (Ground Level) Oct. 12, 2022, [online], [retrieved on May 28, 2024]. Retrieved from the internet URL:https://www.youtube.com/watch?v=VvvPAQb34WM, especially 0:31-1:28.

* cited by examiner

SYSTEMS AND METHODS FOR GENERATING INTERIOR DESIGNS USING ARTIFICIAL INTELLIGENCE

RELATED APPLICATIONS

This application claims priority to U.S. Provisional Patent Application No. 63/451,777, filed Mar. 15, 2023, entitled "Integrated Interior Design, Purchasing And Fulfillment System And Method," which is incorporated by reference herein in its entirety.

TECHNICAL FIELD

The disclosed implementations relate generally to technologies for interior design, and more specifically to systems, methods, and user interfaces for generating interior designs using artificial intelligence.

BACKGROUND

The furnishing industry confronts the challenge of laboriously designing rooms for various purposes, like hotels, student housing, short-term rentals and offices. Both designers and customers endure prolonged iterations spanning months. The traditional furniture purchasing process requires substantial time, resources, and capital, leading to extended lead times that impede revenue potential. In the US alone furniture accounts for 12.2 million tons (4.6%) of household waste dumped in landfills every year impacting the environment. Furthermore, interior updates struggle to keep pace with evolving consumer expectations and industry trends due to the high cost, lead time, and limited affordability of current furnishings, hindering businesses' ability to adapt swiftly.

SUMMARY

Accordingly, there is a need for methods, systems and/or interfaces that address at least some of the deficiencies identified above. Some implementations use artificial intelligence (AI) and/or generative AI models to empower users with seamless access to room design possibilities in real-time. In some implementations, the techniques described herein are implemented in a furniture cloud. Some implementations provide 2-D and/or 3-D visualizations. Some implementations leverage deep learning and generative AI to facilitate a near real-time journey towards bespoke solutions aligned with each customer's interior design specifications. Some implementations adhere to budget and/or timeline constraints. Some implementations integrate available furniture options sourced from a network of suppliers and manufacturers, thereby providing access to custom designs. Some implementations accommodate budget and/or timeline constraints. Some implementations provide a platform for interior design and furnishing. This platform transforms how customers buy and reuse furniture. In some implementations, this includes comprehensive interior design solutions as a service rather than selling individual furniture units like traditional big-box retailers. Some implementations also provide a furniture ecosystem, including but not limited to manufacturers, distributors, retailers, and interior designers, to participate in creating this experience for the customers.

In some implementations, the method includes parsing an inspiration image as an input, identifying coordinates of sub-image(s), and/or isolating the sub-image(s) from the inspiration image. Subsequently, the system retrieves alternative suggestions for each object (sub-image) based on a trained dataset. This step helps ensure precision in extracting the sub-image without any background noise. Next, the system reconstructs multiple variations of the room image using alternative furniture images, presenting the images back to the user for evaluation. Some implementations use one or more artificial intelligence models to generate interior design choices, furnishing options from a number of manufacturers, distributors and retailers. In some implementations, output is securely stored in a blob/file storage for future reference and analysis.

In accordance with some implementations, a method is provided for generating interior design options. The method obtains an inspiration image of a portion or a whole of a room, a furniture, fixture and equipment, or a combination thereof. The method also includes parsing the inspiration image to identify one or more furniture, fixture or equipment, including segmenting the inspiration image into sub-images corresponding to each furniture, fixture or equipment. The method also includes identifying alternatives corresponding to each furniture, fixture or equipment, based on the sub-images and a layout of the room, including coordinating the alternatives with respect to each other and coordinating the alternatives with respect to the room. The method also includes generating and displaying variations of the room with images corresponding to the alternatives corresponding to each furniture, fixture or equipment.

In some implementations, identifying the alternatives corresponding to each furniture, fixture or equipment includes using a web search application programming interface (API) to obtain a plurality of web images of furniture, fixture or equipment, extracting attributes including dominant colors, confidence scores, size and pixel fraction from the plurality of web images, associating the attributes with the plurality of web images, and matching features extracted from the sub-images with the attributes of the plurality of web images to select at least one web image as an alternative.

In some implementations, identifying the alternatives corresponding to each furniture, fixture or equipment includes inputting, a plurality of attributes extracted from the sub-images and the layout of the room, to a trained machine learning model that is trained to output images with furniture, feature or equipment. The trained machine learning model is trained using images with furniture, feature or equipment having different size, style, shape and/or texture, and/or rooms having different lighting, color or ambience and/or layout.

In some implementations, generating the variations of the room includes using a trained generative adversarial network, a trained autoencoder, and/or a trained diffusion model, to generates images with different orientations and/or texture, based on features extracted from the images corresponding to the alternatives.

In some implementations, the method further includes generating color patterns for the alternatives and/or wall color options for the variations that match the alternatives.

In some implementations, the method further includes after displaying the variations, receiving user feedback, and in accordance with a determination that the user feedback requires a change in a layout, and/or orientation of the variations, generating and displaying updated variations.

In some implementations, the method further includes obtaining user input via a conversational interface for specifying furniture, fixtures, and equipment, and generating the alternatives further based on identifying elements and/or style furniture, fixture or equipment, by processing the user input.

In some implementations, displaying the variations includes generating and displaying 2-D and 3-D visualizations, and/or 3D and simulated interactive experience via AR/VR.

In some implementations, generating the variations includes generating layouts and orientation that (i) optimize room aesthetics, lighting, and utilization, and (ii) comply with ADA and regulatory requirements.

In some implementations, generating the variations comprises using generative artificial intelligence-powered backgrounds and themes.

In some implementations, the method further includes storing the variations and using the stored variations to train and/or fine-tune one or more trained machine learning models used to generating the alternatives and/or reconstructing the variations.

In some implementations, customers are provided an option to select an inspiration design from a library of inspirations. In some implementations, the method includes shortlisting options from the library based on customer specifications, such as style and room type. After an inspiration is chosen, the system identifies one or more objects within the image. Subsequently, the system retrieves multiple alternatives for each identified object based on specified parameters like cost and timeline. These alternatives are considered to ensure they align with the customer's requirements. In some implementations, the system then provides a few recommendations with optimal combinations of objects that match the specified cost and timeline parameters.

In some implementations, customers are provided an option to provide one or two reference images, which may not constitute a complete interior design but rather highlight specific pieces they favor, along with room type, cost, and timeline parameters. The method includes extracting attributes from the reference images, such as color, material, and style. Subsequently, the system retrieves multiple alternatives for each identified object based on specified parameters like cost and timeline. These alternatives are curated to ensure alignment with the customer's provided reference style, design, and color preferences. Additionally, in some implementations, the system identifies other matching objects crucial for the entire space. In some implementations, the system then provides a few recommendations with optimal combinations of objects that closely match the customer's input references and specified cost and timeline parameters.

In some implementations, customers provide only the brand name, room type (e.g., King or Double Queen), floor plan or room dimensions, cost, and timeline parameters. The method involves presenting the customer with brand-approved designs while ensuring they fit within the specified floor plan. Subsequently, the system offers alternatives that adhere to the brand guidelines for the customer to choose from, according to some implementations. In some implementations, the system ensures compliance with brand guidelines, encompassing style, material, color patterns, and more, to guarantee a seamless integration of the chosen design within the specified parameters.

In some implementations, customers are provided an option to input solely the room type, floor plan and cost parameters, without providing additional details. In this case, one or more artificial intelligence models generate tailored recommendations based on these inputs. The model utilizes advanced algorithms and data analysis techniques to sift through a vast array of options and identify the most suitable recommendations that align with the specified floor plan, room type and cost constraints.

In another aspect, a method is provided for generating interior design options. The method includes parsing an image uploaded by a user to generate an empty room sketch or schematic with room dimension, generating alternatives for furniture, fixture, and/or equipment to be placed in the empty room according to the room dimensions, and/or generating and displaying a visualization by placing the alternatives for the furniture, fixture, and/or equipment in the room.

In some implementations, the method further includes re-parsing the visualization to extract each furniture, fixture, and/or equipment used in the visualization, identifying matching inventory items that match each furniture, fixture, and/or equipment, based on budget information, type of room, number of rooms, room dimensions, delivery date, location, and/or room images.

In some implementations, a computer system has one or more processors, memory, and a display. The one or more programs include instructions for performing any of the methods described herein.

In some implementations, a non-transitory computer readable storage medium stores one or more programs configured for execution by a computer system having one or more processors, memory, and a display. The one or more programs include instructions for performing any of the methods described herein.

Thus, methods, systems, and graphical user interfaces are disclosed that help enterprise companies improve efficiency of their cloud deployments.

BRIEF DESCRIPTION OF THE DRAWINGS

For a better understanding of the aforementioned systems, methods, and graphical user interfaces, as well as additional systems, methods, and graphical user interfaces that provide data visualization analytics and data preparation, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
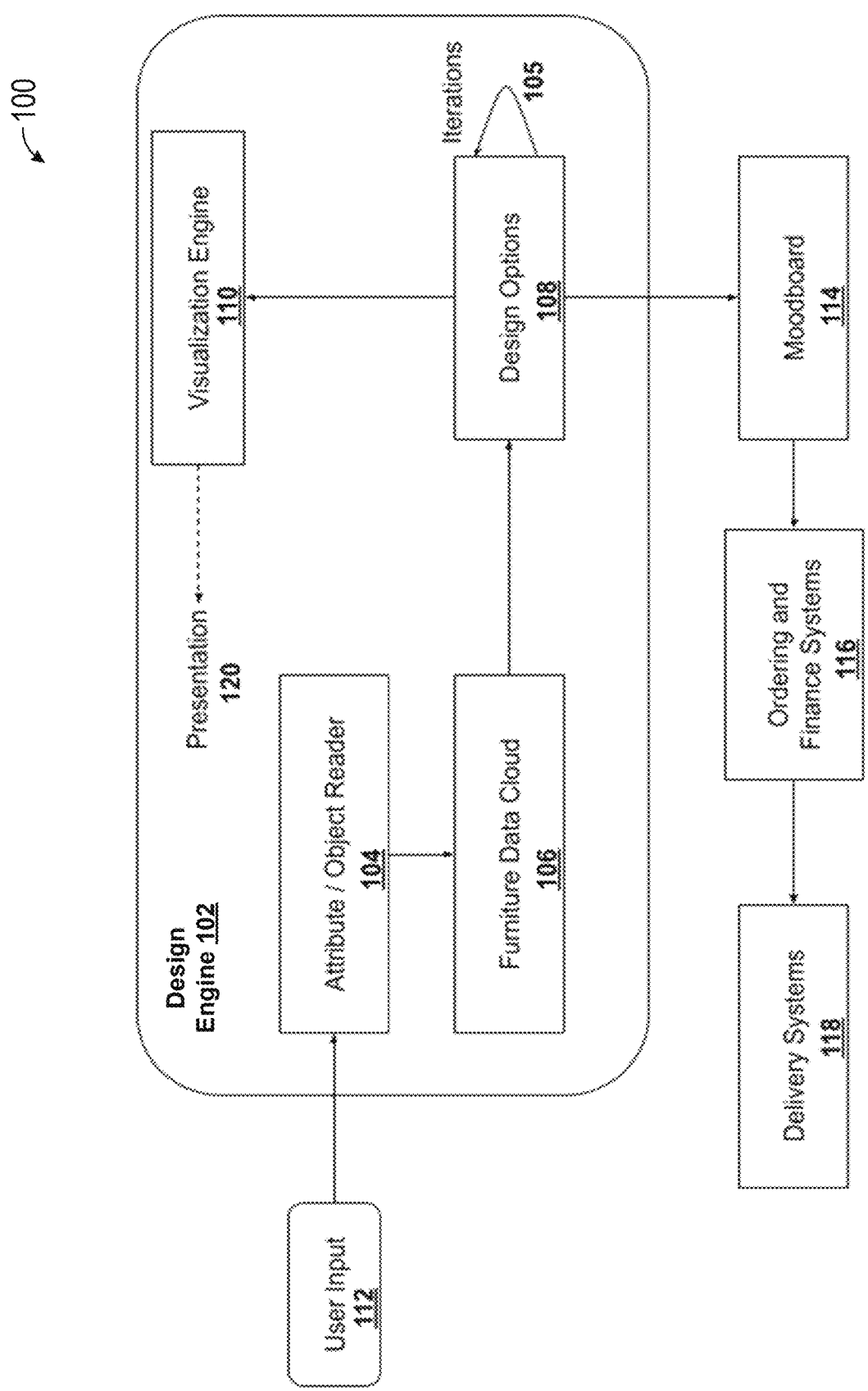
FIG. 1 is a block diagram of an example system for generating interior design options, according to some implementations.

FIG. 1 is a block diagram of an example system 100 for generating interior design options, according to some implementations. The system 100 includes a design engine 102 that processes input parameters (sometimes referred to as user input 112, or as an input) submitted by a user. The input parameters include a variety of input objects, which may include, but are not limited to, textual descriptions, images, and/or other relevant data examples. The input is analyzed to ascertain user preferences related to aesthetic attributes, such as style, hue, texture, and material properties, as well as functional specifications that correspond to the input objects in question. Upon reception of the user input, an attribute/object reader 104 interprets and/or classifies data in the user input 112. In some implementations, this module uses analytical methodologies and/or machine learning algorithms, to extract and distill pertinent attributes from the user input 112. Subsequent to the attribute extraction, the design engine 102 uses a database 106 (sometimes referred to as a furniture data cloud or a furniture database) to generate design options 108 relevant to the attributes and/or the user's stipulated preferences. The database 106 (sometimes referred to as a furniture database) is a repository storing an assortment of entities alongside their respective descriptive characteristics. For example, entities may include furniture, feature, and/or equipment, and/or any associated characteristics, such as color, shape, size, preferred locations. The design engine 108 (sometimes referred to as design options) executes iterative refinement loops 105 to obtain different design options. These loops represent an adaptive feedback mechanism. Through this feedback mechanism, the resultant design options are refined, contingent upon predefined evaluative benchmarks and/or additional input iteratively furnished by the user, thereby ensuring the output's enhanced alignment with the user's demands. Complementary to the design generation process is a visualization engine 110, which renders the formulated design options 108 into a graphical representation (sometimes referred to as a presentation, e.g., rendered via a graphical user interface), facilitating the user's appraisal and selection process.

Some implementations include a mood board 114 (sometimes referred to as a moodboard) that assimilates thematic and inspirational elements (e.g., elements in a design option output by the module 108) into a design configuration, thereby augmenting the personalized aspect of the design options 108. After the generation of the design configuration, in some implementations, the output from the mood board 114 is transmitted to an order and finance system 116, which may in turn interface with a delivery system 118. In some implementations, these logistical modules include tracking, order management, and/or financial transaction systems. In this way, the design engine 102 serves as an expansive operational ecosystem of design conceptualization, visualization, procurement, and/or fulfillment.

Figure 2:
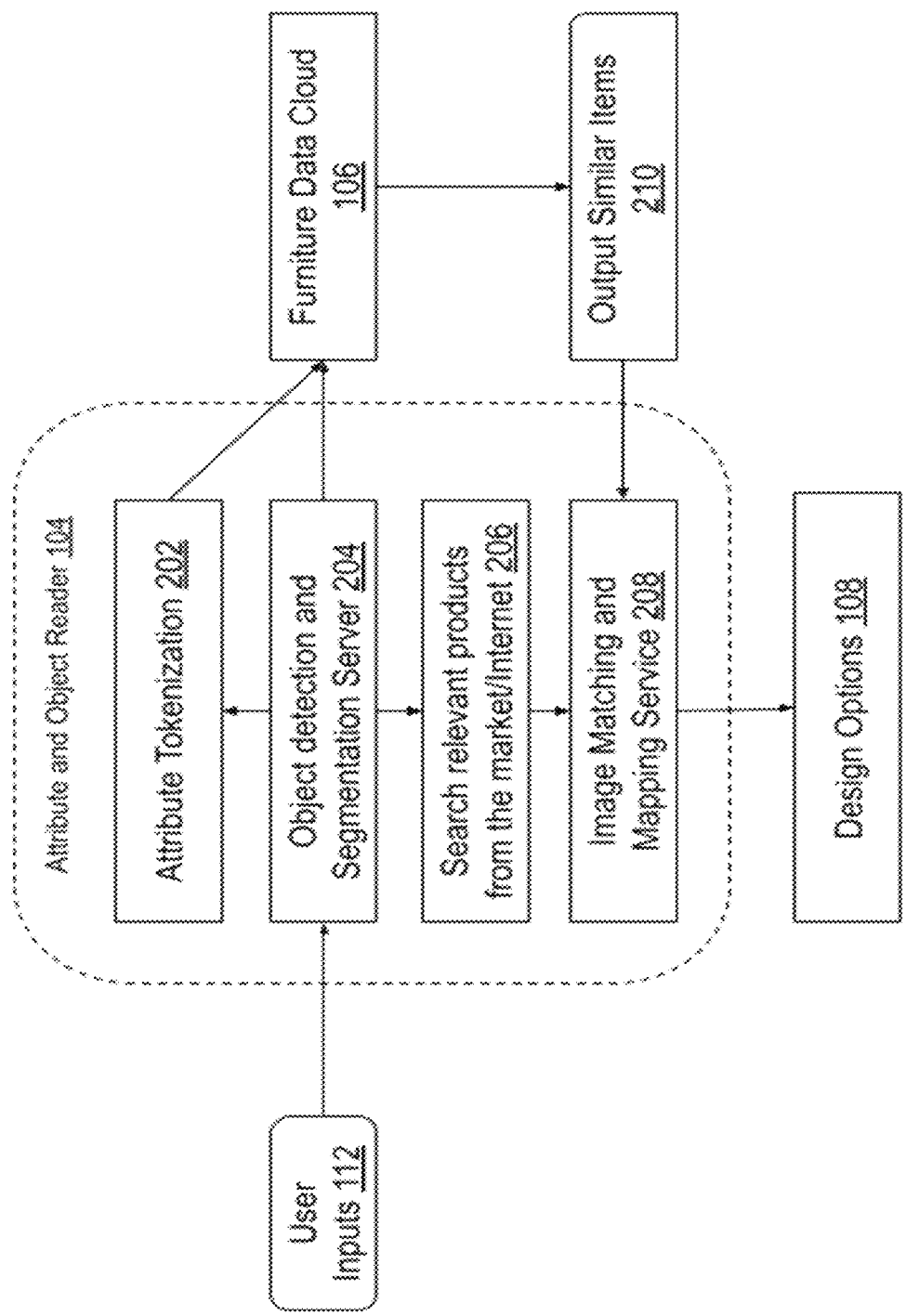
FIG. 2 is a block diagram of an example system for attribute and object reading, according to some implementations.

FIG. 2 is a block diagram of an example system 200 for attribute and object reading, according to some implementations. The user input 112 is input to the attribute and object reader 104 that includes an object detection and segmentation server (ODSS) 204, which interfaces with the user input 102. In some implementations, the user input has different types, such as textual data, visual imagery, and/or interactive data (e.g., data obtained through user engagement via an AI-powered chat agent). Such input is subject to initial processing by the ODSS 204. Upon receipt of the user input 102, the ODSS 204 executes an attribute tokenization process 202 that discerns and categorizes the constituent attributes of the input. In the case of textual data, the tokenization process involves lexical analysis to extract meaningful patterns or entities. For visual inputs, the process entails applying advanced computer vision techniques to identify and segregate distinct objects within the imagery, further analyzing each object's attributes, such as color, material, and stylistic elements. When interacting with an AI chat agent, the module 202 uses natural language processing algorithms to interpret and structure the conversational data, extracting actionable specifications.

Following the attribute extraction, the ODSS 204 performs one or more object detection algorithms capable of discerning the geometry and semantic classification of items within the user input. A segmentation functionality of the ODSS 204 then isolates each detected object, facilitating a granular analysis of individual elements independent of their contextual background within the input medium. The ODSS 204 interfaces with downstream components, such as the furniture cloud 106. The ODSS 204 translates attributes and/or segmented objects into structured queries. These queries are used to retrieve functionally and/or aesthetically comparable alternatives from the furniture database 106 and/or for searching (206) relevant products from the Internet and/or a marketplace. In some implementations, the furniture database 208 includes an indexing and retrieval mechanism. The system thereby enables the dynamic substitution of objects within the initial inspiration image or input parameters, aligning with the user's explicit requirements and implicit preferences, as discerned from the multifaceted user input. In some implementations, the attribute and object reader also includes an image matching and/or mapping service 208 for matching images and/or matching services (e.g., to identify, procure, and/or assemble items). According to some implementations, the attribute and object reader 104 includes machine learning, computer vision, and/or natural language processing techniques, to provide a responsive and intuitive user experience that bridges human input with a repository of tangible items for interior design applications. In some implementations, the module 104 is configured for scalability, accommodating a growing taxonomy of objects and attributes, and to provide precision in the matching and recommendation process, reflecting the user's intent with a high degree of fidelity.

Figure 3:
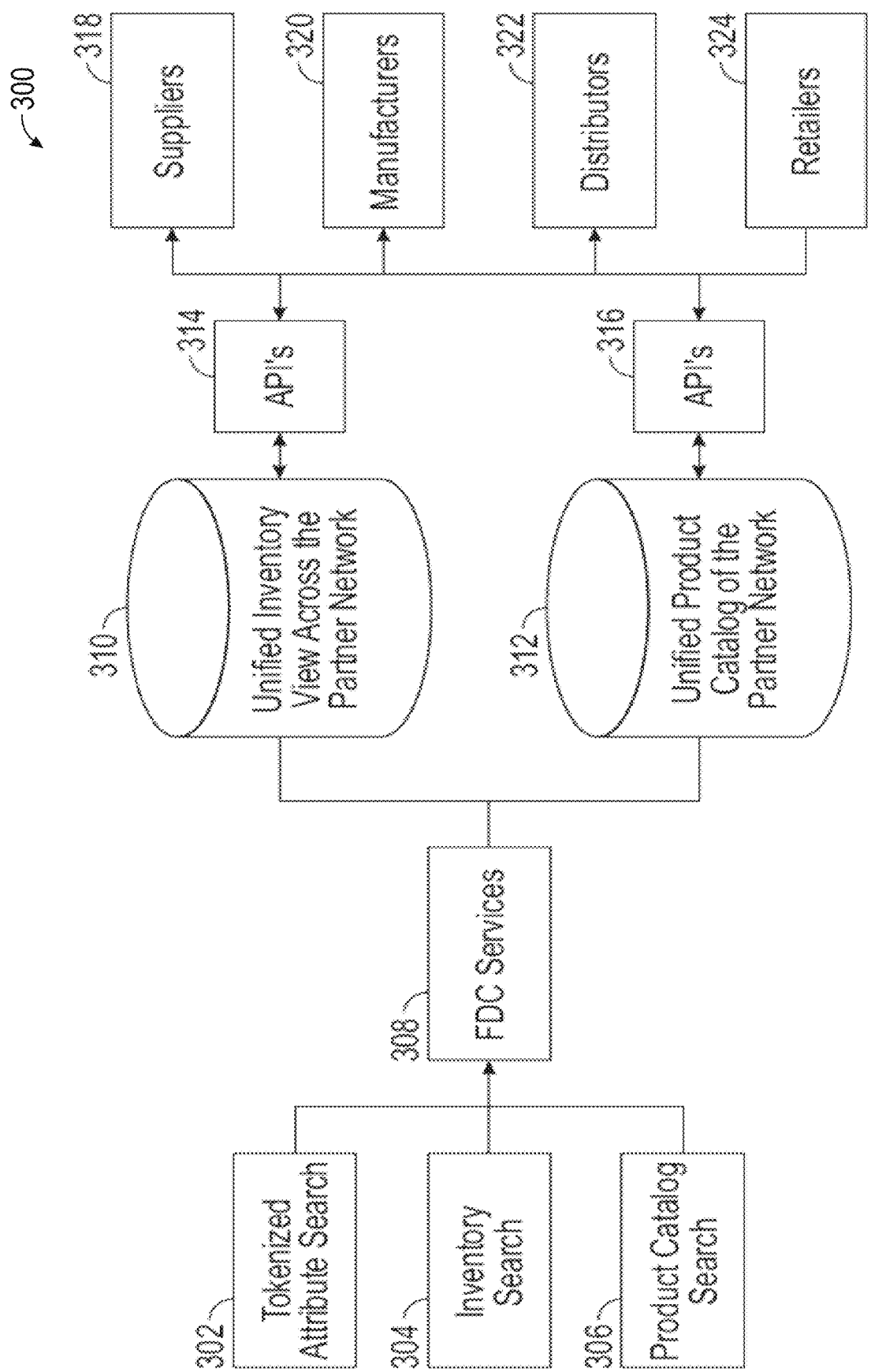
FIG. 3 is a schematic diagram of an example furniture data cloud 300, according to some implementations.

FIG. 3 is a schematic diagram of an example furniture data cloud 300, according to some implementations. In some implementations, the database 106 is a furniture data cloud (sometimes referred to as FDC, a furniture cloud, or a furniture database) configured to aggregate and/or manage an extensive catalog of furniture items supplied by a network of disparate vendors. In some implementations, the FDC serves as a centralized repository, enabling seamless access (e.g., via APIs 314 and/or APIs 316) to a diverse array of inventory items across a spectrum of suppliers, manufacturers, distributors and/or retailers, affiliated with the system. In some implementations, the furniture cloud is a real-time aggregation of data from a number of furniture suppliers 318, manufacturers 320, distributors 322 and/or retailers 324. In some implementations, the database 106 includes a Unified Inventory Access (UIA) 310 component to aggregate and manage a catalog 312 of furniture items supplied by a network of disparate vendors. The UIA serves as a centralized repository, enabling seamless access to a diverse array of inventory items across the complete spectrum of suppliers affiliated with the system. In some implementations, the database 106 includes data management capabilities to synchronize inventory data, including but not limited to product specifications, availability, pricing, and supplier-specific information. In some implementations, the database 106 includes a data schema that categorizes each furniture item by various dimensions, such as style, material, size, color, and/or manufacturer, to facilitate query operations and efficient data retrieval (e.g., tokenized attribute search 302, inventory search 304, and/or product catalog search 306, via FDC services 308 that interfaces with the inventory view 310 and/or the product catalog 312). In some implementations, the dimensions are used for generating design options.

In some implementations, the database includes synchronization mechanisms ensuring real-time data accuracy and consistency across the network. By employing a distributed database model, the database 106 can perform high-speed transactions and updates, thus reflecting changes in inventory levels, new item additions, and/or discontinuations instantaneously or near real-time. In some implementations, API endpoints are integrated within the database, providing the ODSS 204 and other system components with the ability to perform complex queries across the entire inventory dataset. This allows for the dynamic matching of user input from the ODSS to the most relevant and available furniture items, irrespective of the supplier within the network. Furthermore, in some implementations, the database 106 incorporates intelligent algorithms to optimize search and/or retrieval processes, leveraging predictive analytics to anticipate and prioritize inventory based on historical data trends, seasonal demand fluctuations, and user behavior patterns.

In some implementations, the database 106 supports similarity matching and recommendation engines that can propose alternatives when exact matches are not available, thereby enhancing the user experience by offering a range of suitable options. In some implementations, architecture for the database 106 is designed for high scalability, ensuring that it can accommodate the expanding scope of the supplier network and the growing diversity of inventory items. In some implementations, the database 106 also provides data security and integrity, implementing rigorous access controls and data protection protocols to safeguard sensitive supplier and inventory information. In some implementations, the database 106 performs inventory management and access. In some implementations, the database 106 design facilitates a seamless and dynamic interface between the inventory data and the various operational components of the system, thereby enabling a comprehensive and user-centric approach to furniture selection and interior design customization.

Figure 4:
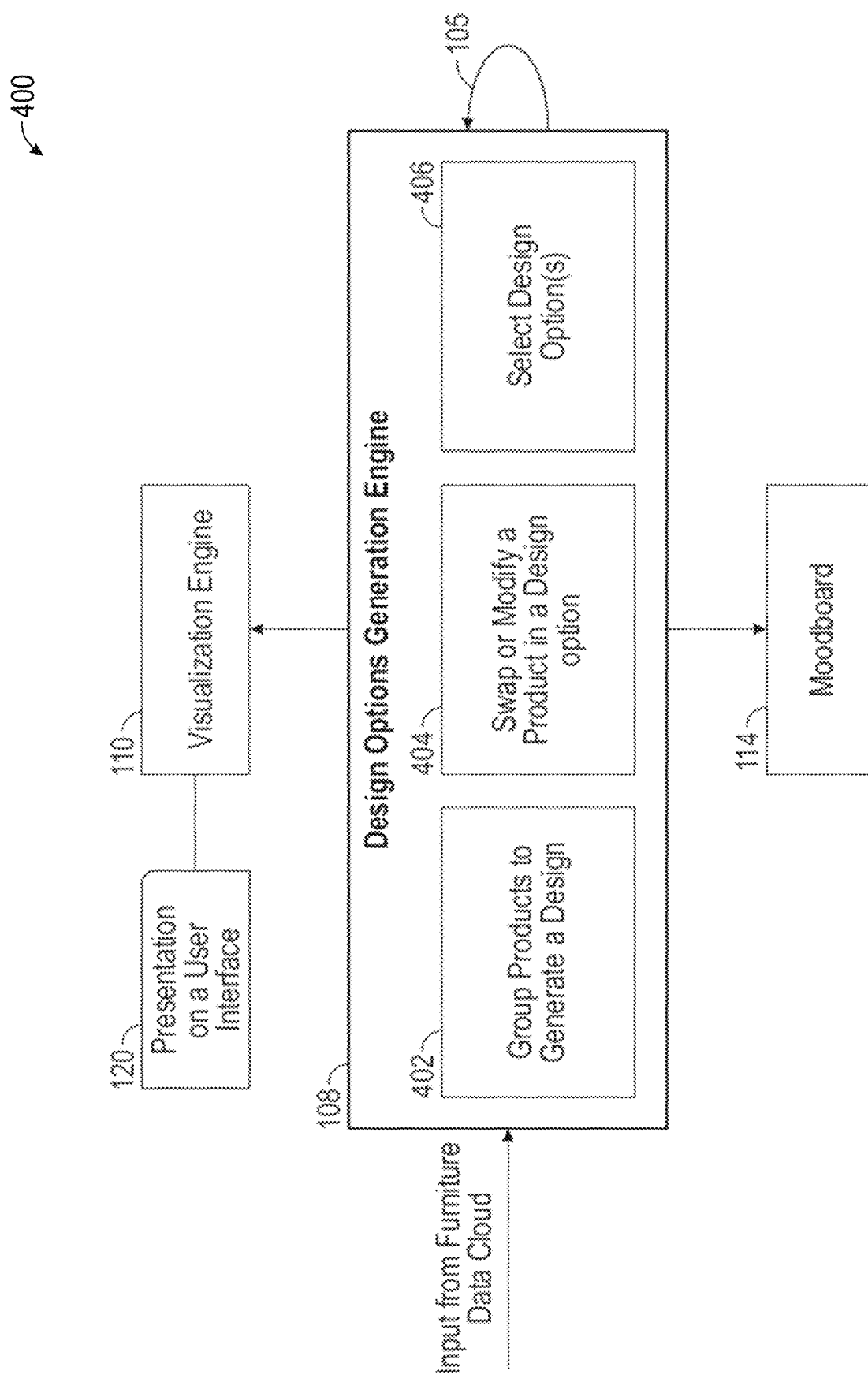
FIG. 4 is a schematic diagram of an example process for design option generation, according to some implementations.

FIG. 4 is a schematic diagram of an example process for design option generation 400, according to some implementations. In some implementations, output from the FDC is input to a design option generator engine (DOGE) 108 to curate a suite of design options. In some implementations, upon receiving a structured output from FDC, the DOGE 108 uses this data to synthesize and present (120) a range of design alternatives aligned with user's preference(s) and/or specifications, via the visualization engine 110. In some implementations, the DOGE includes a module 402 for grouping products to generate a design, a module 404 to swap and/or modify a product in a design option, and/or a module 406 to select design options 406. In some implementations, these modules are exposed to the user via a graphical user interface used to visualize design options. Furthermore, in some implementations, the user interface provides affordance(s) to select, deselect, highlight, and/or blur design options.

In some implementations, the DOGE 108 includes a mood board utility 114, a dynamic feature to visually articulate the ambience and aesthetic theme derived from the selected design options. This utility compiles visual elements, textures, color palettes, and item placements into a coherent visual representation, often referred to as a mood board.

In some implementations, the mood board utility 114 analyses attributes of design option(s), such as style, material, and color schemes, to create a thematic collage. This collage is reflective of a user's envisioned space and serves as a tangible reference point for their desired interior atmosphere. In some implementations, the mood board utility 114 includes one or more algorithms to ensure that a generated mood board maintains design harmony and aesthetic congruity. In some implementations, the generated mood board facilitates an intuitive and immersive user experience, providing users with a holistic preview of the potential outcome of their selected design choices. The mood board 114 helps with decision-making, enabling users to visualize the interplay of various elements and make informed adjustments before finalizing their design selections.

Figure 5:
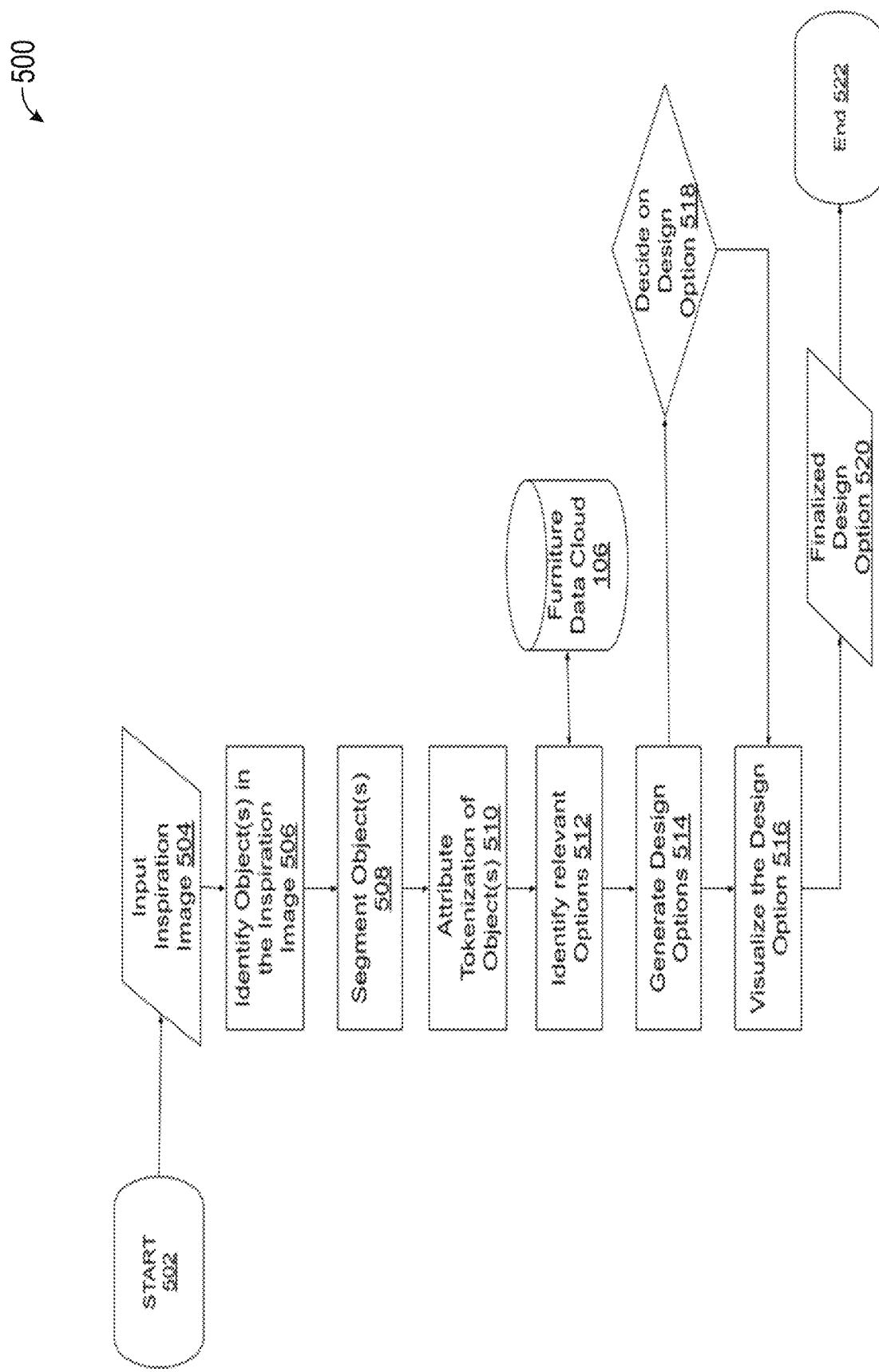
FIG. 5 is a flowchart of an example process for generating interior designs according to some implementations.

FIG. 5 is a flowchart of an example process 500 for generating interior designs according to some implementations. The process is performed by the design engine 108, the mood board 114, and/or the visualization engine 110, described above. In some implementations, the process begins (502) with an input 504 (e.g., an inspiration image and/or input parameters). In some implementations, the system commences its evaluation of the inspiration image by identifying (506) one or more objects of furniture, fixture, or equipment present within the inspiration image. Subsequently, the one or more objects are segmented (508) into individual images, and an attribute and object reader (e.g., the module 202) tokenizes (510) the attributes associated with each object. Next, the furniture data cloud (FDC) identifies (512) relevant items within a network of suppliers, and/or a product catalog. This catalog encompasses items that are either custom-manufactured or sourced from the supplier network. In some implementations, the system identifies items that align with the user's input criteria. After relevant items are identified, they are used to generate (514) design options.

Following the generation of design options, the system facilitates interaction with a user or customer (e.g., the user who provided the inspiration image). This interaction allows the customer to review (518) and/or finalize (520) the design according to their preferences. In some implementations, the system also enables the customer to visualize (516) the finalized design option, thereby providing them with an understanding of the proposed design solution. Through this iterative process, the design engine ensures seamless collaboration between the user and the system, ultimately resulting (522) in the creation of tailored interior design solutions.

Figure 6:
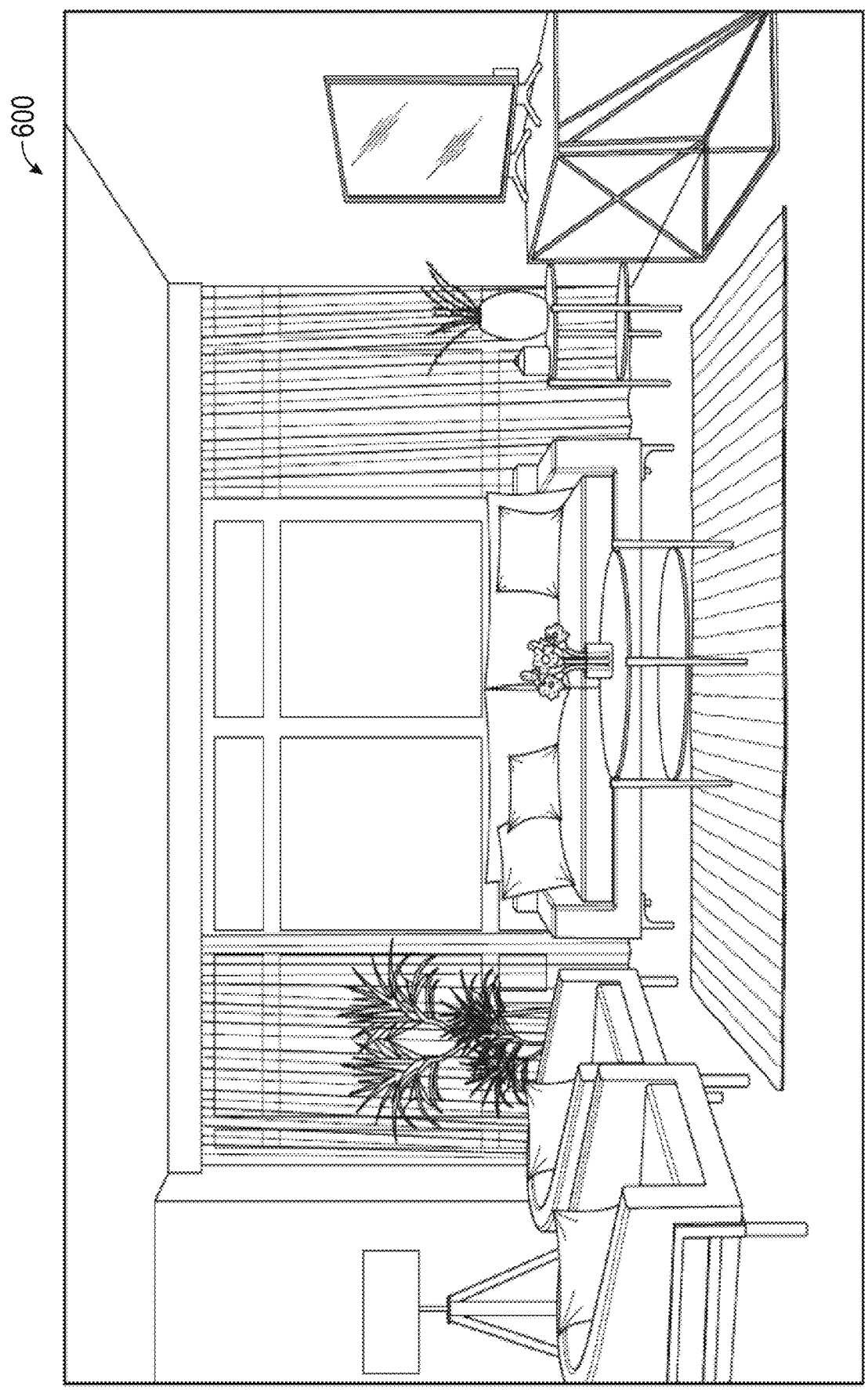
FIG. 6 shows an example inspiration image, according to some implementations.

FIG. 6 shows an example inspiration image 600, according to some implementations. In some implementations, the inspiration image includes a picture of a room, a portion of a building, or a living space. In some implementations, the inspiration image has preferred dimensions and/or number of pixels, suitable for image recognition and/or machine learning algorithms. In some implementations, the inspiration image includes at least one furniture, feature, and/or equipment in a room. The inspiration image serves as an input or inspiration for the rest of a pipeline described above.

Figure 7:
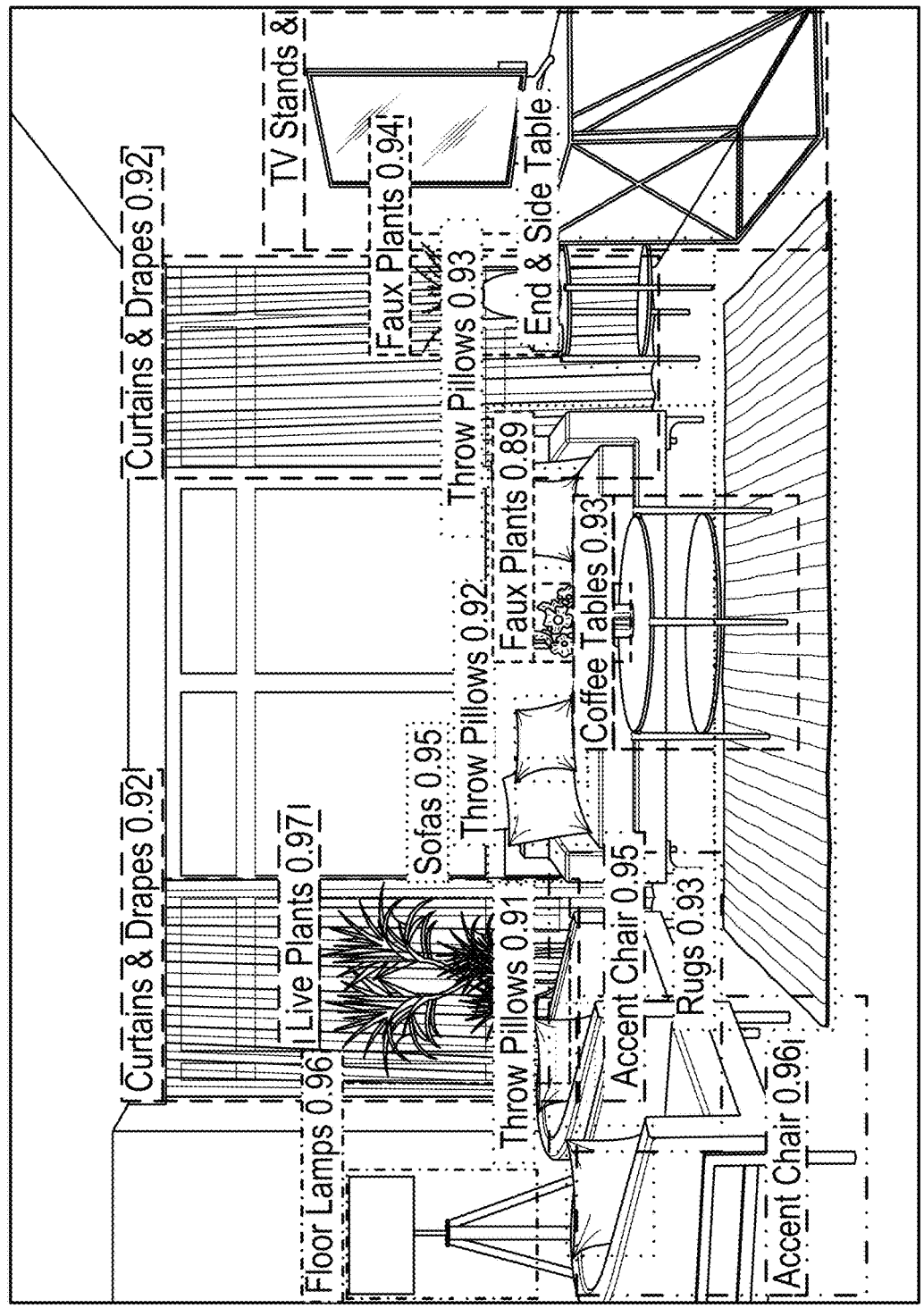
FIG. 7 shows an example segmented image, according to some implementations.

FIG. 7 shows an example segmented image 700, according to some implementations. Various portions or segments of the inspiration image 600 are shown as examples. In this example, curtains and drapes, TV stands, floor lamps, accent chairs, sofas, coffee tables, rugs, faux plants, and end and side tables are identified. The example also illustrated that the segmentation process color codes and/or distinctly identifies a variety of objects. In some implementations, as shown in this example, a probability (sometimes referred to as a confidence score) for the identified object to be a of a certain kind, category, type and/or class, are also be calculated and/or shown in the graphical user interface. In some implementations, a user selects the particular object or objects to focus (e.g., for generation of alternatives).

Figure 8:
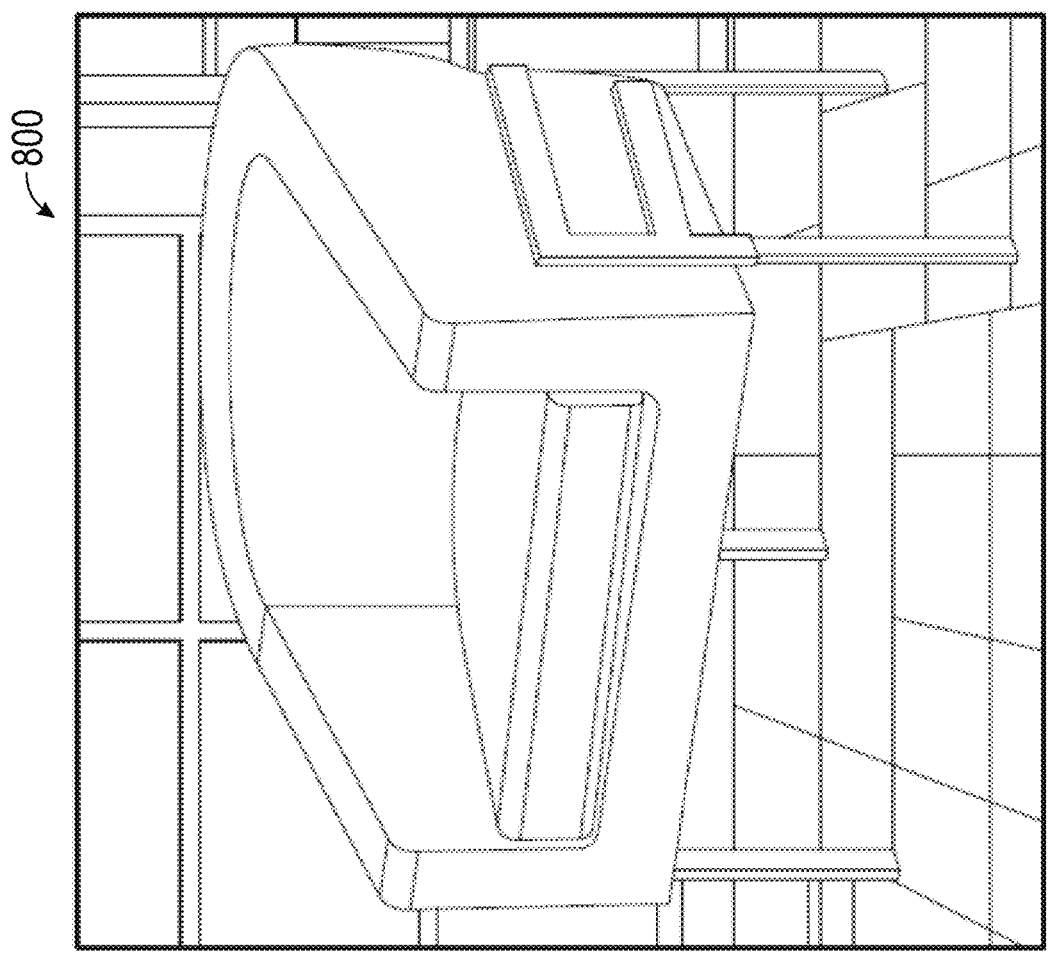
FIG. 8 is an example output of a design engine segmentation process, in accordance with some implementations.

FIG. 8 is an example output 800 of a design engine segmentation process, in accordance with some implementations. In this example, the system identified an accent chair (e.g., by segmenting the inspiration image 700 shown and described above).

Figure 9:
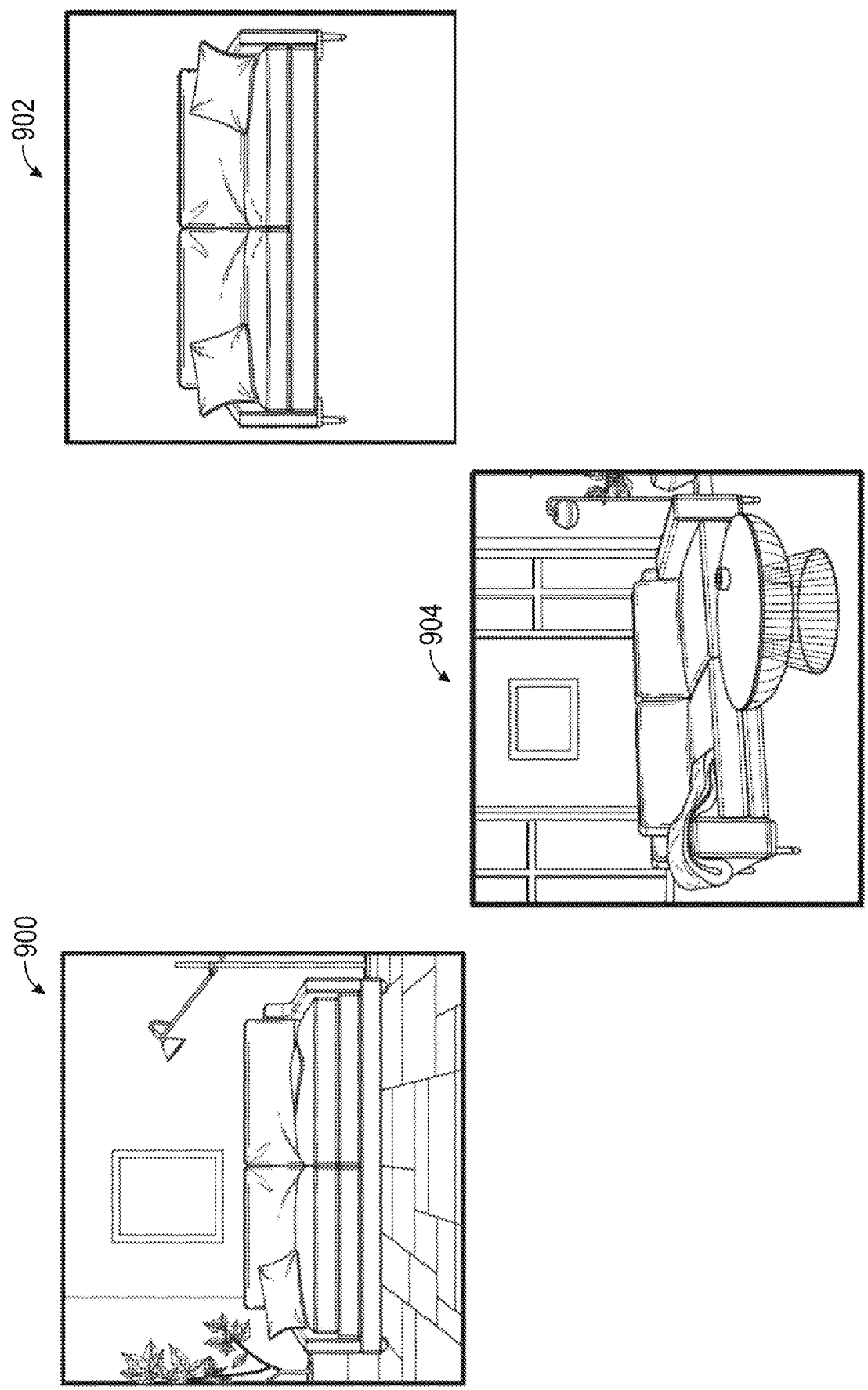
FIG. 9 shows example alternatives, identified from a furniture data cloud, according to some implementations.

FIG. 9 shows example alternatives 900, 902, and 904, identified from a furniture data cloud, according to some implementations. In some implementations, the system described herein identifies one or more furniture items (sofa in this example) in the inspiration image, and subsequently presents alternatives from the furniture data cloud.

In some implementations, components of the system 100 are implemented in one or more server systems as computing modules. A server may include one or more processor(s), a memory, a power supply, an input/output (I/O) subsystem, and/or a communication bus for interconnecting these components. The processor(s) execute modules, programs and/or instructions stored in the memory and thereby perform processing operations, including the methods described herein according to some implementations. In some implementations, the server also includes a display for displaying visualizations (e.g., the alternatives shown in FIG. 9). In some implementations, the server generates displays or visualizations, and transmits the visualization (e.g., as a visual specification) to a client device for display. Some implementations of the server include touch, selection, or other I/O mechanisms coupled to the server via the I/O subsystem, to process input from users that select (or deselect) visual elements of a displayed visualization. In some implementations, the client device (or software therein) processes user input and transmits a signal to the server which is processed by the server. Some aspects of the server (e.g., the modules in the memory) are implemented in one or more client devices, according to some implementations.

In some implementations, the memory stores one or more programs (e.g., sets of instructions), and/or data structures, collectively referred to as "modules" herein. In some implementations, the memory, or the non-transitory computer readable storage medium of the memory, stores the following programs, modules, and data structures, or a subset or superset thereof: an operating system, various modules and data structures required for performing operations of components of the system 100. The above identified modules (e.g., data structures, and/or programs including sets of instructions) need not be implemented as separate software programs, procedures, or modules, and thus various subsets of these modules may be combined or otherwise re-arranged in various implementations. In some implementations, the memory stores a subset of the modules identified above. In some implementations, a database (e.g., a local database and/or a remote database) stores one or more modules identified above and data associated with the modules. Furthermore, the memory may store additional modules not described above. In some implementations, the modules stored in the memory, or a non-transitory computer readable storage medium of memory, provide instructions for implementing respective operations in the methods described herein. In some implementations, some or all of these modules may be implemented with specialized hardware circuits that subsume part or all of the module functionality. One or more of the above identified elements may be executed by one or more of processor(s). In some implementations, the I/O subsystem communicatively couples the server to one or more devices, such as enterprise client devices, any other computing systems, via a local and/or wide area communications network (e.g., the Internet) via a wired and/or wireless connection. The communication bus optionally includes circuitry (sometimes called a chipset) that interconnects and controls communications between system components.

Figure 10:
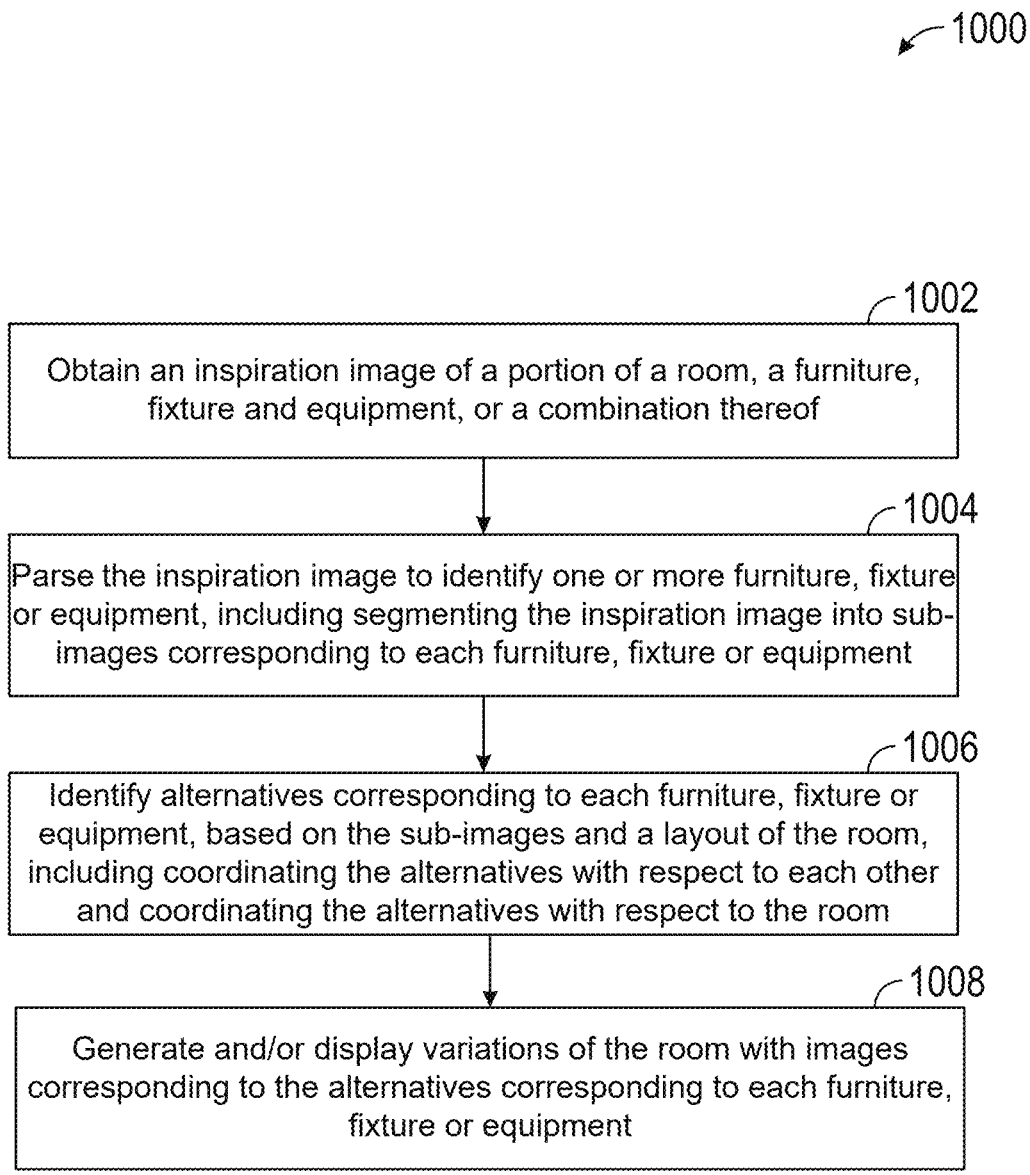
FIG. 10 provides a flowchart of an example method for generating design options, in accordance with some implementations.

FIG. 10 provides a flowchart of an example method 1000 for generating design options, in accordance with some implementations. The method 1000 is performed by one or more modules or components of the system 100 described above.

The method obtains (1002) an inspiration image (sometimes referred to as a user input; e.g., the image 600, FIG. 6; user input 112, FIG. 1, a representation of inspiration) of a portion or a whole of a room, a furniture, fixture and equipment, or a combination thereof.

The method also includes parsing (1004) (e.g., by the attribute and object reader 104) the inspiration image to identify one or more furniture, fixture or equipment, including segmenting the inspiration image into sub-images (sometimes referred to as independent objects; e.g., FIG. 700) corresponding to each furniture, fixture or equipment. In some implementations, the parsing includes object detection using YOLO V8, $U^2$ Net. In some implementations, the segmenting is performed using Mask R-CNN.

In some implementations, parsing the inspiration image to identify the one or more furniture, fixture or equipment includes inputting the inspiration image to a plurality of trained machine learning models that is trained to identify images with furniture, feature or equipment. In some implementations, each trained machine learning model of the plurality of trained machine learning models is trained on a distinct interior design segment within hospitality and commercial office sectors, encompassing hotels, student housing, multi-family residences, and commercial offices. In some implementations, each trained machine learning model is trained to analyze space types, furniture, fixture and equipment category within its respective interior design segment. In some implementations, the space types include living rooms, bedrooms and common areas. In some implementations, at least one trained machine learning model of the plurality of trained machine learning models performs object detection using YOLO V8, R-CNN, or $U^2$ Net. In some implementations, the plurality of trained machine learning models is trained to output a plurality of attributes for the sub-images corresponding to each furniture, fixture or equipment.

The method also includes identifying (1006) alternatives corresponding to each furniture, fixture or equipment, based on the sub-images and a layout of the room, including coordinating the alternatives with respect to each other and coordinating the alternatives with respect to the room. In some implementations, identifying the alternatives corresponding to each furniture, fixture or equipment includes using a web search application programming interface (API) to obtain a plurality of web images of furniture, fixture or equipment, extracting attributes including dominant colors (e.g., red is more prevalent than green), confidence scores/ probabilities, size and pixel fraction from the plurality of web images, associating the attributes with the plurality of web images, and matching features extracted from the sub-images with the attributes of the plurality of web images to select at least one web image as an alternative. Some implementations use SERP API and/or Vision API, to search the Internet, and/or to obtain attributes, such as dominant colors, confidence scores, size and/or pixel fraction (e.g., a fraction of the pixels in an inspiration image versus pixels in an alternative form the furniture data cloud). Some implementations use a furniture data cloud API to search for alternative images available in a database (e.g., the database 106) that match the attributes. In some implementations, identifying the alternatives corresponding to each furniture, fixture or equipment includes inputting, a plurality of attributes extracted from the sub-images and the layout of the room, to a trained machine learning model that is trained to output images (e.g., images with different size, style, shape and/or texture, and/or rooms having different lighting, color or ambience and/or layout) with furniture, feature or equipment. The trained machine learning model is trained using images with furniture, feature or equipment having different size, style, shape and/or texture, and/or rooms having different lighting, color or ambience and/or layout. Example alternatives are shown in and described above in reference to FIG. 9, according to some implementations.

In some implementations, identifying the alternatives corresponding to each furniture, fixture or equipment includes interfacing with a furniture data cloud storing and managing inventory and product catalog from a network of one or more suppliers, manufacturers and distributors, and identifying the alternatives based on information from the furniture data cloud. In some implementations, identifying the alternatives corresponding to each furniture, fixture or equipment includes (i) identifying inventory corresponding to each furniture, fixture or equipment based on a user provided timeline and cost parameters, and (ii) optimizing inventory identification based on a proximity to a location and cost.

The method also includes generating and/or displaying (1008) variations of the room with images corresponding to the alternatives corresponding to each furniture, fixture or equipment. In some implementations, generating the variations of the room includes using a trained generative adversarial network, a trained autoencoder, and/or a trained diffusion model, by providing one or more prompts to generate images with different orientations and/or texture, based on features extracted from the images corresponding to the alternatives. For example, suppose there is an image with a sofa in a right orientation. To obtain an image of the sofa in left orientation, the prompt may include "orient the sofa left." Similarly, "change the background color to blue" or "change the background color to match the color of the sofa" may be used to adjust color of background. In some implementations, displaying the variations includes generating and displaying 2-D and 3-D visualizations, and/or 3D and simulated interactive experience via AR/VR. In some implementations, generating the variations includes generating layouts and orientation that (i) optimize room aesthetics, lighting, and utilization, and (ii) comply with ADA and regulatory requirements. In some implementations, generating the variations comprises using generative artificial intelligence-powered backgrounds and themes.

Some implementations use generative artificial intelligence (AI) models, such as Stable Diffusion. For orientation, some implementations use StyleGAN3 trained on diverse dataset containing furniture images from different angles. Some implementations use Pix2pix3D model to generate 3D model mesh, texture file, and/or material file, followed by PyTorch3D differential rendering. Some implementations use Nerfs and/or Shape-e to produce texture-less 3D meshes. Some implementations use open3d to apply appropriate texture. Some implementations use pix2pixhd model to generate corresponding texture, or texture-less 3D models. Some implementations perform template matching using ORM and/or SIFT.

In some implementations, Furniture, Fixtures, and Equipment (FFE) are specified using Building Information Modeling (BIM) standards and/or object libraries for representing and/or exchanging data about building components, including FFE objects. Product data templates and/or catalogs from organizations, such as British Institute of Facilities Management and National Building Specification, may be used as data templates to encode how FFE product data is structured and exchanged between manufacturers, suppliers, designers and facilities managers. Digital catalogs from manufacturers and/or specification sheets in formats, such as PDF, XML, IFC, that describe FFE products are used in some implementations. In some implementations, room data sheets are used to document the FFE requirements and provisions for each room or space type. These often use spreadsheets or database templates with coded designations for different FFE types. Some implementations use proprietary and/or project-specific schemas, taxonomies and/or nomenclatures to classify, identify and/or track FFE assets. In some implementations, a conversational interface allows a user to provide such information and/or make updates to such information.

In some implementations, the inspiration image is used to generate a similar or close alternative. The alternatives may represent ideas. For example, chairs in a friends room, including a sofa, may be provided as inspiration, and the system responds with the room in a contemporary style. In some implementations, no images and no ideas are provided by a user, only a budget and/or a style may be provided; the system responds with inspirations, with or without style, match and/or costs. The user may provide a feedback (e.g., to change color) and the system may then change the particular feature and regenerate and/or redisplay the image.

In some implementations, for furniture, fixture and/or equipment, an inspiration image, room layout and/or lighting, may be provided. In some implementations, the system responds with multiple furniture layouts (e.g., layouts that match different floor layouts). In some implementations, models described above are trained using FFE and/or furnishing images. For example, variations of the inspiration image 600 (e.g., the images 900, 902, 904) may be used for training the models to generate alternatives for other inspiration images. In some implementations, features are extracted from the training images and used to train the machine learning models. In some implementations, the features include size, style, shape and/or texture, and/or rooms having different lighting, color or ambience and/or layout. Some implementations coordinate FFE amongst themselves. Some implementations take into account budget, inventory, and/or deadlines/timelines for a design option. Some implementations generate alternative shapes for a same furniture (e.g., a right sectional for a left sectional sofa). Some implementations generate alternatives at different locations of a room (e.g., in front of a room as opposed to a back of a room). Models may be generated to understand these characteristics, and/or to generate appropriate alternatives.

In some implementations, the method further includes generating color patterns for the alternatives and/or wall color options for the variations that match the alternatives.

In some implementations, the method further includes, after displaying the variations, receiving user feedback (e.g., user feedback in relation to any user input categories, such as price, timeline, design, color, material, and anchor furniture), and in accordance with a determination that the user feedback requires a change in a layout, and/or orientation of the variations, generating and displaying updated variations.

In some implementations, the method further includes obtaining user input via a conversational interface for specifying furniture, fixtures, and equipment, and generating the alternatives further based on identifying elements and/or style furniture, fixture or equipment, by processing the user input.

In some implementations, generating the variations includes generating layouts and orientation that (i) optimize room aesthetics, lighting, and utilization, and/or (ii) comply with American Disabilities Act (ADA) and/or regulatory requirements.

In some implementations, displaying the variations includes generating and displaying two-dimensional, isometric or three-dimensional visualizations, and/or simulated or rendered interactive experience via augmented reality (AR) or virtual reality (VR).

In some implementations, generating the variations includes using generative artificial intelligence-powered environments and themes.

In some implementations, the method further includes storing the variations (e.g., storing to the furniture data cloud 106) and/or using the stored variations to train and/or fine-tune one or more trained machine learning models used to generate the alternatives and/or reconstruct the variations.

In some implementations, the inspiration image is an image for a sketch or schematic with room dimensions for an empty room. In some implementations, identifying alternatives includes generating alternatives for furniture, fixture, and/or equipment to be placed in the empty room according to the room dimensions. In some implementations, generating and displaying variations of the room includes generating and displaying a visualization by placing the alternatives for the furniture, fixture, and/or equipment in the empty room. In some implementations, the method further includes re-parsing the visualization to extract each furniture, fixture, and/or equipment used in the visualization, and identifying matching inventory items that match each furniture, fixture, and/or equipment, based on budget information, type of room, number of rooms, room dimensions, delivery date, location, and/or room images.

Figure 11:
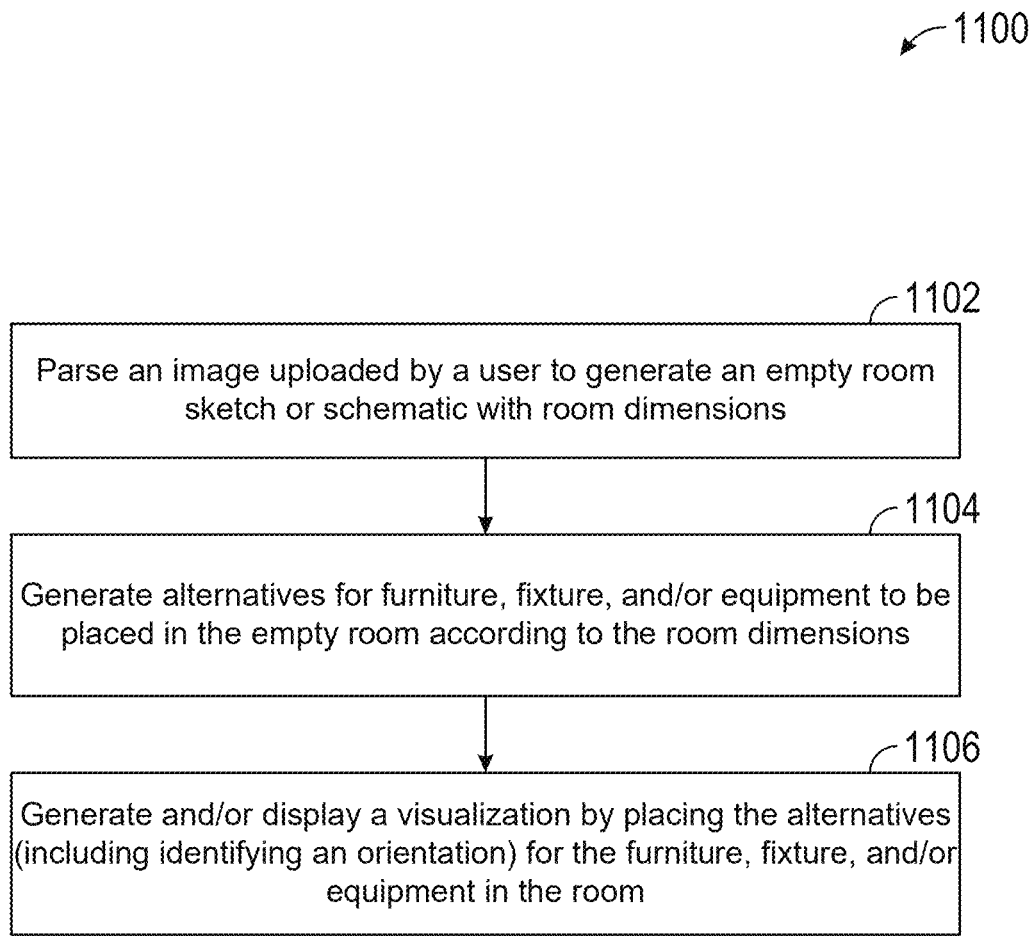
FIG. 11 provides a flowchart of another example method for generating design options, in accordance with some implementations.

FIG. 11 provides a flowchart of another example method 1100 for generating design options, in accordance with some implementations. The method 1100 is performed by one or more modules or components of the system 100 described above. For brevity, details described above in reference to FIG. 10 are not repeated here. But similar features and/or operations, and/or a subset thereof, as in the example method 1000, are performed, in the context of the example method 1100, in accordance with some implementations.

The method includes parsing (1102) an image uploaded by a user (e.g., the image shown in FIG. 6) to generate an empty room sketch or schematic with room dimension. In some implementations, this step includes extracting object annotation, attributes, dimensions, coordinates and/or orientation, in the case of an inspiration image, using Vision API and/or Eden AI. CVAT can be used for annotating and labeling custom datasets.

The method also includes generating (1104) alternatives for furniture, fixture, and/or equipment to be placed in the empty room according to the room dimensions. In some implementations, wall colors that match the FFE are used to color coordinate placement or suggestions of alternatives.

The method also includes generating and/or displaying (1106) a visualization by placing the alternatives (including for example, determining orientation) for the furniture, fixture, and/or equipment in the room.

In some implementations, the method further includes re-parsing the visualization to extract each furniture, fixture, and/or equipment used in the visualization, identifying matching inventory items that match each furniture, fixture, and/or equipment, based on budget information, type of room, number of rooms, room dimensions, delivery date, location, and/or room images.

Figure 12A:
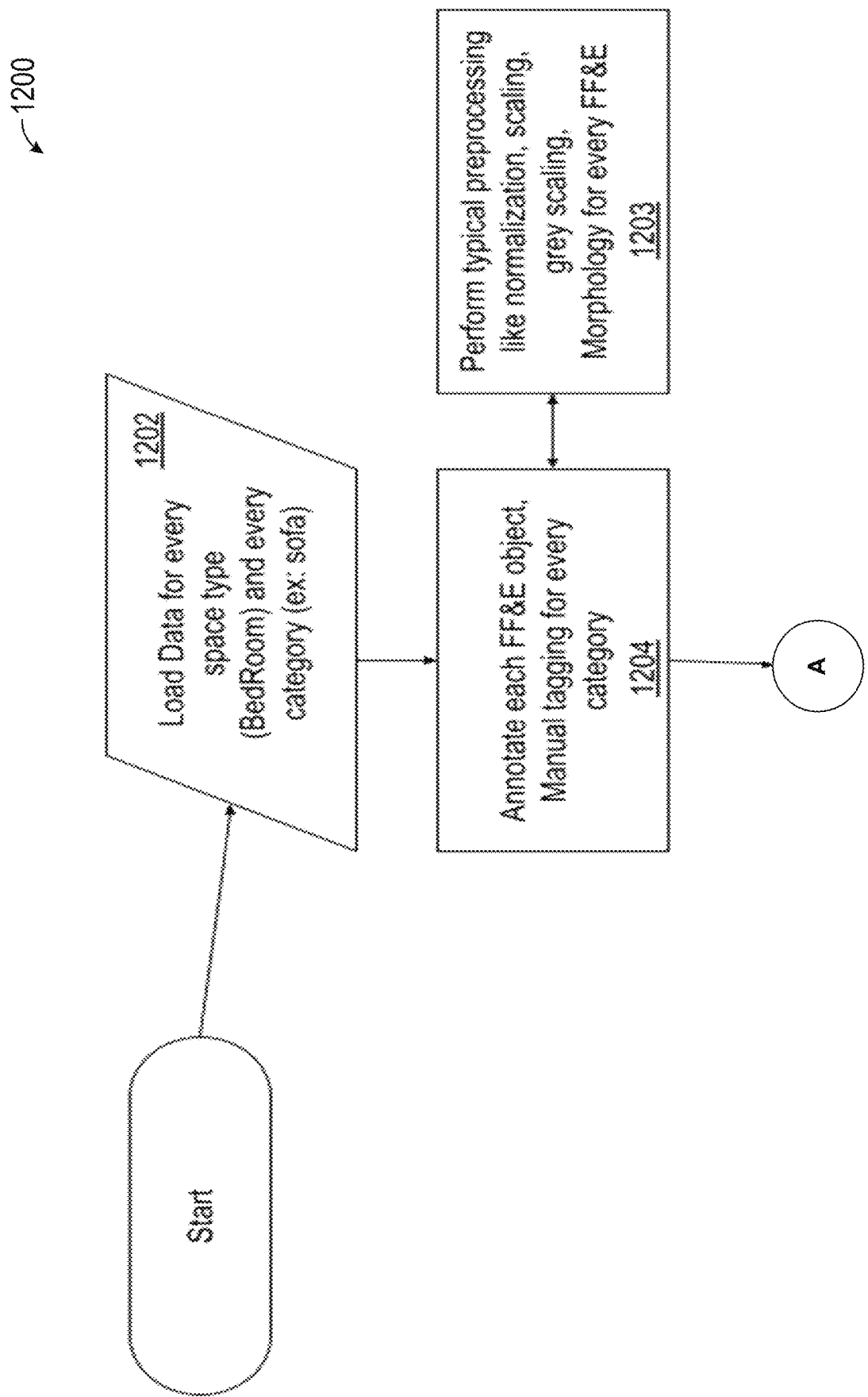
FIGS. 12A-12C show a flowchart for an example method for training, data tagging and/or annotation for generating interior designs, according to some implementations.
Figure 12B:
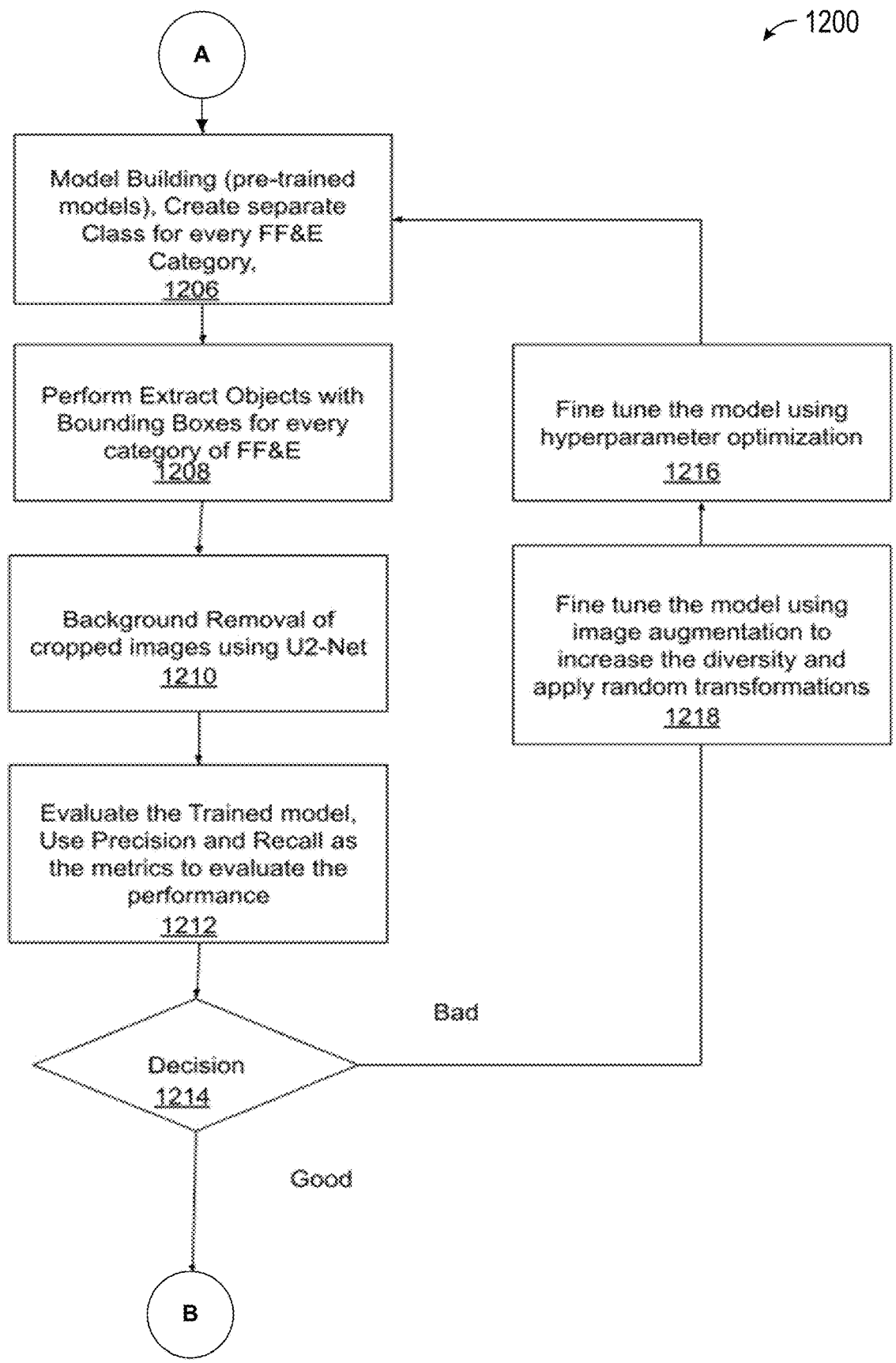
Figure 12C:
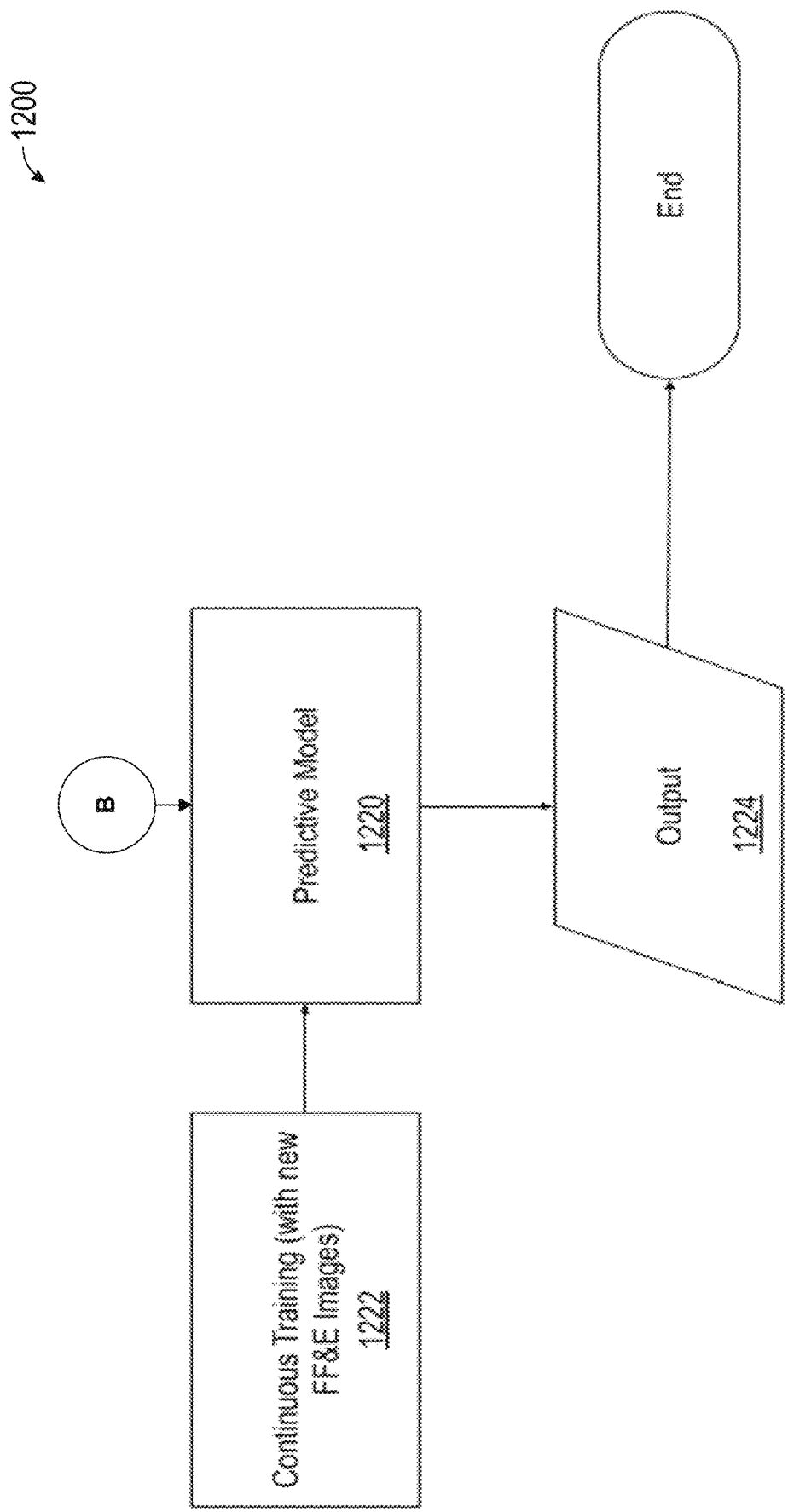

FIGS. 12A-12C show a flowchart for an example method 1200 for training, data tagging and/or annotation for generating interior designs, according to some implementations. The method 1200 is performed by one or more modules or components of the system 100 described above, according to some implementations. The task of identifying attributes for each piece of furniture, fixture, or equipment within an image is performed by the attribute tokenization 202 in FIG. 2. Some implementations use the method 1200 to refine annotation or labeling of one or more category of the furniture, fixture and equipment. Some implementations use a uber model that integrates multiple models specialized in extracting diverse attributes. In some implementations, these attributes encompass various facets, such as design style, primary material, secondary material, primary color, and size. The method 1200 is adaptable and can accommodate variations inherent to different types of furniture, fixtures and/or equipment.

The method 1200 includes loading (1202) data for space types (e.g., bed room, living room), and different categories (e.g., sofa). In some implementations, model training, data tagging, and/or annotation includes creating distinct classes for each object, such as a sofa, an accent chair or any furniture, fixture and equipment objects in input images, and annotating (1204) them accordingly. This tagging process for furniture category and overlapping and adjacent objects is used for training the model. In some implementations, this tagging process is useful when furniture and fixtures are overlapping in any space setting. Manual tagging and/or automated tagging (e.g., using conventional image recognition techniques) may be used. The method 1200 also includes data preprocessing (1203) whereby dimensions are added to images to facilitate batch processing, and image representations are converted from integer to float values. Various preprocessing tasks, such as normalization, scaling, and/or morphology, are performed to optimize image data of every single furniture category for model input.

Referring next to FIG. 12B, the method 1200 also includes model building (1206). In some implementations, the method includes creating separate class for each furniture, feature and equipment category. The method includes performing object extraction (sometimes referred to as object detection) (1208) using bounding boxes for each category. Some implementations perform object detection using YOLO V8 and/or R-CNN models, trained on the COCO dataset, and/or background removal (1210) of cropped images using $U^2$ NET and/or Mask R-CNN models. Subsequently, the trained model is evaluated (1212) for performance; valuation metrics, such as precision and recall are used to assess classification and localization performance. If the evaluation does not meet (decision 1214) a performance threshold (e.g., 0.6, 0.3), augmentation techniques (1218) may be used to fine tune the model using image augmentation to increase the diversity and/or applying random transformations. This step helps diversify training data for every category. In some implementations, this step includes image resizing, different orientation, image rotation, and/or image flip, thereby enhancing the model robustness. In some implementations, data augmentation varies for each category based on the room type and also how certain furniture is placed in a space setting. For example, if a furniture is placed in an orientation facing a wall, or if it is placed in the front of a room, the furniture may be rotated and/or moved (in the image or sub-image). Such techniques may be used to obtain a more diverse data resulting in a better training set and hence a better trained model. The training process results in a trained machine learning model or a predictive model (1220), which may include testing for assessing model accuracy on unseen data and iterating on model training, as necessary. In some implementations, the model is continuously trained (1222). Visualizing bounding boxes on original images can be used to analyze model predictions and refine performance. In this way, the one or more machine learning models (sometimes referred to as artificial intelligence models) may be developed and/or trained for object detection and/or background removal tasks (for generating output 1224), specifically related to furniture, feature and/or equipment.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of generating interior design options, comprising:
    obtaining an inspiration image of a portion of a room;
    parsing the inspiration image using a plurality of trained machine learning models to:
    (a) identify and segment one or more furniture, fixture or equipment items into sub-images, and (b) extract a plurality of attributes for each identified furniture, fixture or equipment item from the sub-images,
    wherein each model of the plurality of trained machine learning models is trained on a distinct interior design segment within hospitality and commercial office sectors, the segments comprising hotels, student housing, multi-family residences, and commercial offices, wherein each model of the plurality of trained machine learning models is trained using a training dataset comprising images with furniture, fixture or equipment having variations in size, style, shape and texture, and rooms having variations in lighting, color, ambience and layout within its respective interior design segment, and wherein each model of the plurality of trained machine learning models is trained to analyze space types including living rooms, bedrooms and common areas;
    identifying alternatives corresponding to each furniture, fixture or equipment by:
    (a) querying a furniture data cloud storing inventory and product catalogs from a network of suppliers, manufacturers and distributors, using the extracted attributes,
    (b) considering user-provided budget constraints and style preferences, and
    (c) taking into account the layout of the room; and
    generating and displaying variations of the room with images corresponding to the alternatives corresponding to each furniture, fixture or equipment, wherein generating the variations of the room comprises using a trained generative adversarial network, a trained auto-encoder, and a trained diffusion model to generate images with different orientations and/or texture, based on features extracted from images corresponding to the alternatives;
    creating separate classes for each furniture, feature and equipment category;
    performing object extraction using bounding boxes for each of the furniture, feature and equipment categories;
    performing background removal of cropped images;
    using precision and recall as metrics for evaluating a performance of the plurality of trained machine learning models; and
    fine tuning the plurality of trained machine learning models using image augmentation to increase diversity and applying random transformations in response to the evaluation not meeting a performance threshold whereby more diverse data results in a better training set and whereby a predictive model is continuously trained to make generative output related to the furniture, feature and/or equipment categories more accurate.

2. The method of claim 1, wherein identifying the alternatives corresponding to each furniture, fixture or equipment comprises:
    using a web search application programming interface (API) to obtain a plurality of web images of furniture, fixture or equipment;

extracting attributes including dominant colors, confidence scores, size and pixel fraction from the plurality of web images;
associating the attributes with the plurality of web images; and
matching features extracted from the sub-images with the attributes of the plurality of web images to select at least one web image as an alternative.

3. The method of claim 1, wherein identifying the alternatives
corresponding to each furniture, fixture or equipment comprises:
inputting a plurality of attributes extracted from the sub-images and the layout of the room to a trained machine learning model that is trained to output images with furniture, fixture or equipment, wherein the trained machine learning model is trained using images with furniture, fixture or equipment having different size, style, shape and/or texture, and/or rooms having different lighting, color or ambience and/or layout.

4. The method of claim 1, further comprising: generating color patterns for the alternatives and wall color options for the variations that match the alternatives.

5. The method of claim 1, wherein generating the variations comprises generating layouts and orientation that (i) optimize room aesthetics, lighting, and utilization, and (ii) comply with the Americans with Disabilities Act (ADA) and regulatory requirements.

6. The method of claim 1, wherein generating the variations comprises using generative artificial intelligence-powered backgrounds and themes.

7. The method of claim 1, further comprising:
after displaying the variations, receiving user feedback; and in accordance with a determination that the user feedback requires a change in a layout, and orientation of the variations, generating and displaying updated variations.

8. The method of claim 1, further comprising:
obtaining user input via a conversational interface for specifying furniture, fixtures, and equipment; and
generating the alternatives further based on identifying elements and style of furniture, fixture or equipment, by processing the user input.

9. The method of claim 1, wherein displaying the variations of the room comprises generating and displaying (i) 2-D visualizations or 3-D visualizations of the room, or (ii) ~3D and simulated interactive experience via AR/VR, using the images corresponding to the alternatives corresponding to each furniture, fixture or equipment.

10. The method of claim 1, further comprising:
storing the variations and using the stored variations to train or fine-tune one or more trained machine learning models used for generating the alternatives or reconstructing the variations.

11. The method of claim 1, wherein the plurality of trained machine learning models performs object detection and segmentation using YOLO, R-CNN and $U^2$ Net.

12. The method of claim 1, wherein identifying the alternatives corresponding to each furniture, fixture or equipment comprises interfacing with a furniture data cloud storing and managing inventory and product catalog from a network of one or more suppliers, manufacturers and distributors, and identifying the alternatives based on information from the furniture data cloud.

13. The method of claim 1, wherein identifying the alternatives corresponding to each furniture, fixture or equipment comprises (i) identifying inventory corresponding to each furniture, fixture or equipment based on a user provided timeline and cost parameters, and (ii) optimizing inventory identification based on proximity to a location and cost.

14. A system, comprising:
one or more processors;
memory;
wherein the memory stores one or more programs configured for execution by the one or more processors, and the one or more programs comprising instructions for:
obtaining an inspiration image of a portion of a room;
parsing the inspiration image using a plurality of trained machine learning models to:
(a) identify and segment one or more furniture, fixture or equipment items into sub-images, and
(b) extract a plurality of attributes for each identified furniture, fixture or equipment item from the sub-images,
wherein each model of the plurality of trained machine learning models is trained on a distinct interior design segment within hospitality and commercial office sectors, the segments comprising hotels, student housing, multi-family residences, and commercial offices, wherein each model of the plurality of trained machine learning models is trained using a training dataset comprising images with furniture, fixture or equipment having variations in size, style, shape and texture, and rooms having variations in lighting, color, ambience and layout within its respective interior design segment, and wherein each model of the plurality of trained machine learning models is trained to analyze space types including living rooms, bedrooms and common areas;
identifying alternatives corresponding to each furniture, fixture or equipment by:
(a) querying a furniture data cloud storing inventory and product catalogs from a network of suppliers, manufacturers and distributors, using the extracted attributes,
(b) considering user-provided budget constraints and style preferences, and
(c) taking into account the layout of the room; and
generating and displaying variations of the room with images corresponding to the alternatives corresponding to each furniture, fixture or equipment, wherein generating the variations of the room comprises using a trained generative adversarial network, a trained autoencoder, and a trained diffusion model to generate images with different orientations and/or texture, based on features extracted from images corresponding to the alternatives;
creating separate classes for each furniture, feature and equipment category;
performing object extraction using bounding boxes for each of the furniture, feature and equipment categories;
performing background removal of cropped images;
using precision and recall as metrics for evaluating a performance of the plurality of trained machine learning models; and
fine tuning the plurality of trained machine learning models using image augmentation to increase diversity and applying random transformations in response to the evaluation not meeting a performance threshold whereby more diverse data results in a better training set and whereby a predictive model is continuously trained to make generative output related to the furniture, feature and/or equipment categories more accurate.

15. A non-transitory computer readable storage medium storing one or more programs configured for execution by a computer system having one or more processors, the one or more programs comprising instructions for:

obtaining an inspiration image of a portion of a room;

parsing the inspiration image using a plurality of trained machine learning models to:
  (a) identify and segment one or more furniture, fixture or equipment items into sub-images, and
  (b) extract a plurality of attributes for each identified furniture, fixture or equipment item from the sub-images, wherein each model of the plurality of trained machine learning models is trained on a distinct interior design segment within hospitality and commercial office sectors, the segments comprising hotels, student housing, multi-family residences, and commercial offices, wherein each model of the plurality of trained machine learning models is trained using a training dataset comprising images with furniture, fixture or equipment having variations in size, style, shape and texture, and rooms having variations in lighting, color, ambience and layout within its respective interior design segment, and wherein each model of the plurality of trained machine learning models is trained to analyze space types including living rooms, bedrooms and common areas;

identifying alternatives corresponding to each furniture, fixture or equipment by:
  (a) querying a furniture data cloud storing inventory and product catalogs from a network of suppliers, manufacturers and distributors, using the extracted attributes,
  (b) considering user-provided budget constraints and style preferences, and
  (c) taking into account the layout of the room; and generating and displaying variations of the room with images corresponding to the alternatives corresponding to each furniture, fixture or equipment, wherein generating the variations of the room comprises using a trained generative adversarial network, a trained auto-encoder, and a trained diffusion model to generate images with different orientations and/or texture, based on features extracted from images corresponding to the alternatives;

creating separate classes for each furniture, feature and equipment category;

performing object extraction using bounding boxes for each of the furniture, feature and equipment categories;

performing background removal of cropped images;

using precision and recall as metrics for evaluating a performance of the plurality of trained machine learning models; and fine tuning the plurality of trained machine learning models using image augmentation to increase diversity and applying random transformations in response to the evaluation not meeting a performance threshold whereby more diverse data results in a better training set and whereby a predictive model is continuously trained to make generative output related to the furniture, feature and/or equipment categories more accurate.

* * * * *